(12) United States Patent
Jeong

(10) Patent No.: US 8,400,716 B2
(45) Date of Patent: *Mar. 19, 2013

(54) IMAGING LENS

(75) Inventor: Hyejung Jeong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 131 days.

This patent is subject to a terminal disclaimer.

(21) Appl. No.: 12/974,724

(22) Filed: Dec. 21, 2010

(65) Prior Publication Data

US 2011/0149415 A1    Jun. 23, 2011

(30) Foreign Application Priority Data

Dec. 21, 2009 (KR) .................. 10-2009-0128163

(51) Int. Cl.
*G02B 3/02* (2006.01)
*H04N 5/225* (2006.01)

(52) U.S. Cl. ...................... 359/714; 348/340

(58) Field of Classification Search ............... 359/714, 359/763, 764; 348/340
See application file for complete search history.

(56) References Cited

U.S. PATENT DOCUMENTS

| | | | |
|---|---|---|---|
| 6,104,544 A * | 8/2000 | Matsuzawa et al. | 359/649 |
| 2011/0115965 A1 * | 5/2011 | Engelhardt et al. | 348/345 |
| 2011/0181963 A1 * | 7/2011 | Kwon | 359/718 |

* cited by examiner

Primary Examiner — David N Spector
(74) Attorney, Agent, or Firm — Saliwanchik, Lloyd & Eisenschenk

(57) ABSTRACT

Provided is an imaging lens, including a first lens having positive (+) refractive power; a second lens having negative (−) refractive power; a third lens having negative (−) refractive power; a fourth lens having negative (−) refractive power; and a fifth lens having positive (+) refractive power in order from an object side, where the third lens is formed concavely at an object side.

20 Claims, 4 Drawing Sheets

IMAGING LENS

CROSS-REFERENCE TO RELATED APPLICATION

This application claims the benefit under 35 U.S.C. §119 of Korean Application No. 10-2009-0128163, filed on Dec. 21, 2009, which is hereby incorporated by reference in its entirety.

BACKGROUND OF THE DISCLOSURE

1. Field of the Invention

The present invention relates to an image lens, and in particular, to an image lens adequate for a camera module using a high-resolution image sensor.

2. Discussion of the Related Art

Recently, vigorous research efforts are being made in the field of a mobile phone-purpose camera module, a digital still camera (DSC), a camcorder, and a PC camera (an imaging device attached to a person computer) all connected with an image pick-up system. One of the most important components related to such systems is an imaging lens to produce an image.

Previously, there have been attempts to construct an imaging lens of high-resolution by using 5 pieces of lenses. Each of 5 pieces of lenses is comprised of lenses with a positive (+) refractive power and lenses with a negative (−) refractive power. For example, an imaging lens is constructed on a structure of PNNPN (+−−+−), PNPNN (+−+−−) or PPNPN (++−+−) in order starting from an object side. However, an imaging module of such a framework fails to show approving optic characteristics or aberration characteristics. Accordingly, a high-resolution imaging lens of a new power structure is required.

BRIEF SUMMARY

An image lens according to one embodiment of the present invention includes a first lens having positive (+) refractive power; a second lens having negative (−) refractive power; a third lens having negative (−) refractive power; a fourth lens having negative (−) refractive power; and a fifth lens having positive (+) refractive power in an ordered way from an object side, wherein an object surface of the third lens is formed concavely.

An image lens according to the present embodiment has a lens framework in which a first lens and a fifth lens have positive (+) power and inversely a second lens through a fourth lens have negative (−) power, that is, it provides an imaging lens of an PNNNP power structure. An imaging lens with superiority in aberration characteristic may be realized.

An imaging lens according to another embodiment of the invention includes, in an order from an object side, a first lens having positive (+) refractive power; a second lens having negative (−) refractive power; a third lens having negative (−) refractive power; a fourth lens having negative (−) refractive power; and a fifth lens having positive (+) refractive power, wherein the first lens is convexly formed at the object side surface, and the second lens and the third lens are concavely formed at the object side surface.

DETAILED DESCRIPTION

Figure 1:
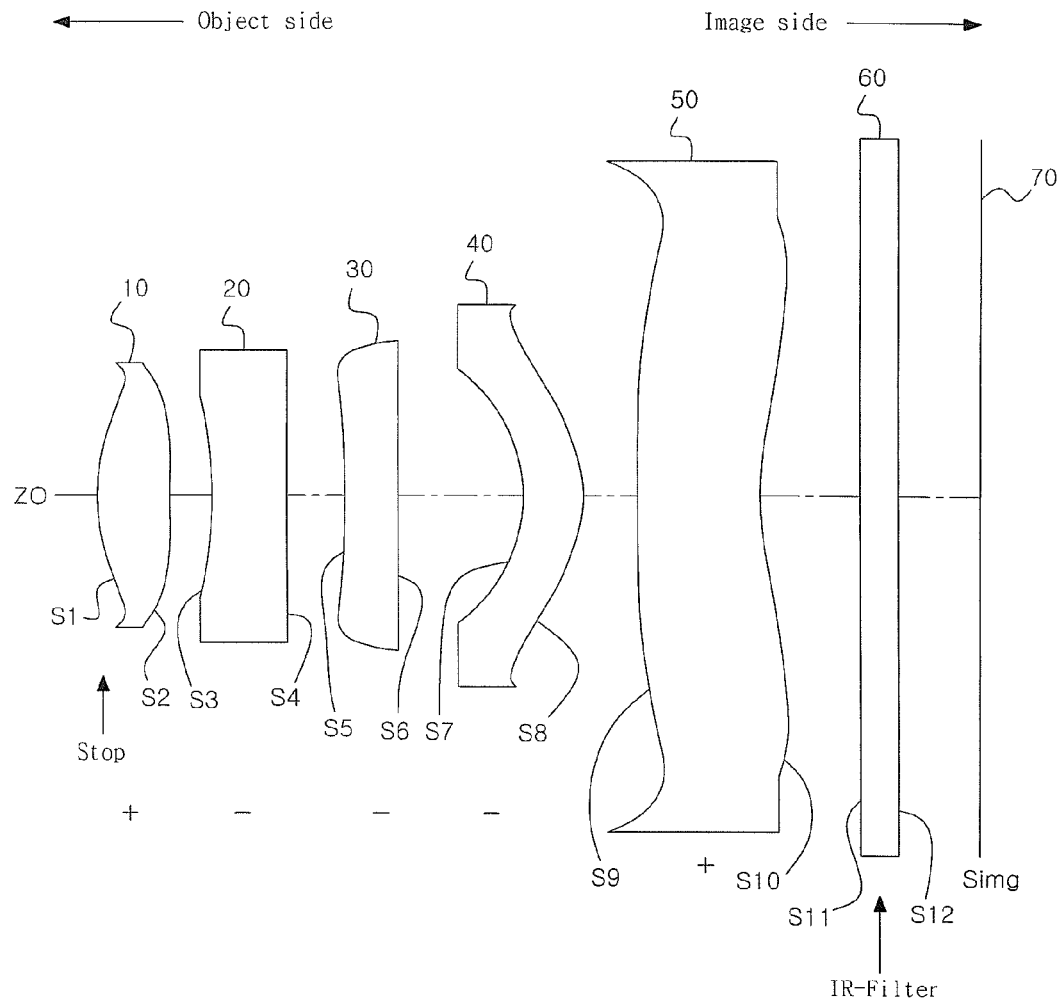
FIG. 1 is a construction diagram of an imaging lens according to an embodiment of the present invention.

Since the present invention can be applied with various changes thereto and several types of embodiments, specific embodiments intend to be exemplified in the drawings and minutely described in the detailed description. However, it should not be appreciated in a limiting sense of limiting the present invention to a specific example but to include all the changes, equivalents and replacements which fall in the spirit and technical scope of the present invention.

Stated that any component is "connected" or "conjunctive" to another component, it will be appreciated to be directly connected or conjunctive to the very another component or otherwise that there exists any component in the midst of them.

In the following, the present invention will be described in detail referring to the attached drawings, but without regard to a drawing sign, an identical or corresponding component is assigned the same reference numeral and a redundant description regarding this will be omitted.

As a construction diagram of a camera lens module according to the present embodiment, FIG. 1 is a lateral surface construction diagram exemplifying a layout state of a lens around an optical axis ZO. In the construction of FIG. 1, a thickness, size, and shape of a lens are rather overdrawn for description, and a spherical or aspheric shape has been only presented as one embodiment, but obviously not limited to this shape.

Referring to FIG. 1, a camera lens module of the present invention has a layout construction with a first lens 10, a second lens 20, a third lens 30, a fourth lens 40, a fifth lens 50, a filter 60, and a light receiving element 70 in order starting from an object side.

Light corresponding to image information of a subject passes through the first lens 10, the second lens 20, the third lens 30, the fourth lens 40, the fifth lens 50, and the filter 60 to be incident on the light receiving element 70.

Hereinafter, in description of a construction of each lens, "object side surface" means a surface of a lens facing an object side to an optical axis, and "image side surface" means a surface of a lens facing an image surface to an optical axis.

A first lens 10 has a positive (+) refractive power, and its object side surface S1 is convexly formed. An object side surface S1 of a first lens 10 may act as a camera aperture, and in this case, an imaging lens of the present embodiment does not need an additional aperture at all. A second lens 20 has a negative (−) refractive power, and its object side surface S3 is concavely formed.

The object side surface and image side surface of a third lens 30, a fourth lens 40 and a fifth lens 50 are all constructed of an aspheric shape. The third lens 30 and the fourth lens 40 have a negative (−) refractive power, and the fifth lens 50 has a positive (+) refractive power.

As shown in the figure, an object side surface S5 of a third lens 30 is concavely formed, an image side surface S8 of a fourth lens 40 is a convexly-formed meniscus shape, and an object side surface S9 of a fifth lens 50 is a convexly-formed meniscus shape.

Herein, both surfaces of an object side surface S9 and an image side surface S10 of a fifth lens 50 are all aspheric shapes having an inflection point. As shown in the figure, an image side surface S10 of a fifth lens 50 is bent to an imaging side as heading from a central part which is centered on an optical axis ZO to a surrounding, and again forms an aspheric inflection point by bending toward an object side as heading a surrounding part which is far away from an optical axis ZO to an outermost part area.

An aspheric inflection point formed at a fifth lens 50 may adjust a maximum emergence angle of a primary ray incident on a light receiving element 70. And, an aspheric point formed at an object side surface S9 and an object side surface S10 of a fifth lens 40 adjusts a maximum emergence angle of a primary ray, and inhibits a shading of a surrounding part of a screen.

The filter 60 is at least any one of optical filters such as an infrared filter and a cover glass. A filter 60, in a case an infrared filter is applied, blocks such that radiating heat emitting from external light does not transfer to the light receiving element 70. Also, an infrared filter penetrates visible light and reflects infrared for outflow to an external part.

The light receiving element 70 is an imaging sensor such as CCD (Charge Coupled Device) or CMOS (Complementary Metal Oxide Semiconductor).

The first lens 10, the second lens 20, the third lens 30, the fourth lens 40, and the fifth lens 50 use an aspheric lens like a later-described embodiment, thereby improving resolution of a lens and taking an advantage of superior aberration characteristic.

The later-explained conditions and embodiment is a preferred embodiment raising an action and influence, and it would be understood by a person in the art that the present invention should be constructed of the following conditions. For example, a lens construction of the invention will have a raised action and effect only by satisfying any part of conditions among lower-part described condition equations.

$0.5 < f1/f < 1.5$ [Condition 1]

$0.5 < d/f < 1.5$ [Condition 2]

$20 < V2 < 30$ [Condition 3]

$1.6 < N2 < 1.7$ [Condition 4]

where,
f: overall focal length of imaging lens
f1: focal length of first lens
d: thickness of overall optical system
V2, V3, V4, V5: Abbe value of second lens through fifth lens
N2: refractive index of second lens Condition 1 specifies refractive power of a first lens 10. The first lens 10 has a refractive power having proper spherical aberration and proper chromatic aberration corrected by Condition 1. Condition 2 specifies a dimension of an optical axis direction of an overall optical system, that is, defines a subminiature lens related condition and a proper aberration correction related condition.

Condition 3 specifies Abbe value of a second lens 20, and Condition 4 specifies Abbe value of a third lens 30 through a fifth lens 50. Specification of Abbe value of each lens is conditions for satisfactorily correcting chromatic aberration. Condition 5 specifies refracting power of a second lens 20.

Hereinafter, an action and effect of the present invention will be presented with reference to a specific embodiment. An aspheric shape mentioned in the following embodiment is obtained from a known Equation 1, and Conic constant and 'E and its continuing number' used in aspheric coefficient A, B, C, D, E, F indicate power of 10. For example, E+01 indicates $10^1$, and E−02 indicates $10^{-2}$.

$$z = \frac{cY^2}{1 + \sqrt{1-(1+K)c^2Y^2}} + AY^4 + BY^4 + CY^4 + DY^4 + EY^4 + FY^4 + \ldots$$

where,
z: distance in optical axis direction from top point of lens
c: basic curvature
Y: distance in perpendicular direction to optical axis
K: Conic constant

EMBODIMENT

The following Table 1 shows an embodiment complying with the above-described Condition.

TABLE 1

|  | Embodiment |
| --- | --- |
| f | 2.9 |
| f1 | 3.58 |
| f2 | −26.8 |
| f3 | −95.1 |
| f4 | −378.6 |
| f5 | 5.03 |
| \|f2/f1\| | 7.48 |
| T | 4.4 |
| T/f | 1.52 | where, f2, f3, f4, f5: focal length of second lens through fifth lens,

T: distance from object side surface of first lens to its image-forming surface

Referring to Table 1, f1/f is 1.23, so that a match with Condition 1 can be known.

An embodiment of the following Table 2 shows a more specific embodiment compared to that of Table 1.

TABLE 2

| Surface number | Curvature Radius (R) | Thickness or Distance (d) | Refractive index (N) | Material |
| --- | --- | --- | --- | --- |
| 1* | 1.78 | 0.49 | 1.58 | Glass mold (GM) |
| 2* | 11.5 | 0.20 | | |
| 3* | −19.8 | 0.52 | 1.61 | Plastic (P) |
| 4* | 93.5 | 0.20 | | |
| 5* | 4.90 | 0.45 | 1.53 | Plastic (P) |
| 6* | 4.33 | 0.53 | | |
| 7* | 4.51 | 0.47 | 1.53 | Plastic (P) |
| 8* | 4.24 | 0.62 | | |
| 9* | 0.87 | 0.50 | 1.53 | Plastic (P) |
| 10* | 1.02 | 0.39 | | |
| 11 | 0 | 0.3 | 1.52 | IR-filter |
| 12 | 0 | 0.3 | | |
| image | 0 | 0 | | |

In the above Table 2 and the following Table 3, notation*stated next to surface numbers indicates an aspheric surface.

The following Table 3 indicates a value of an aspheric coefficient of each lens in an embodiment of the Table 2.

TABLE 3

| Surface number | A | B | C | D |
|---|---|---|---|---|
| 1* | 0.436829E−02 | 0.780087E−02 | −0.455985E−01 | 0.534782E−01 |
| 2* | −0.771613E−02 | −0.614739E−0 | 0.880672E−01 | −0.176714E+00 |
| 3* | −0.118890E−01 | −0.117196E−0 | −0.117283E−01 | −0.166593E−01 |
| 4* | 0.137515E−01 | 0.107342E−01 | 0.799978E−02 | 0.130584E−01 |
| 5* | −0.302212E−01 | −0.323485E−0 | 0.112479E−01 | 0.101135E−01 |
| 6* | −0.29218E−01 | −0.109657E−0 | −0.163068E−01 | −0.746997E−02 |
| 7* | −0.438459E−01 | −0.215758E−0 | −0.191531E−01 | −0.240266E−01 |
| 8* | −0.217577E−01 | −0.114130E−0 | −0.100496E−01 | −0.253567E−02 |
| 9* | −0.284623E+00 | 0.326114E+00 | −0.181441E+00 | 0.575826E−01 |
| 10* | −0.394156E+00 | 0.347355E+00 | −0.227534E+00 | 0.931315E−01 |

Figure 2:
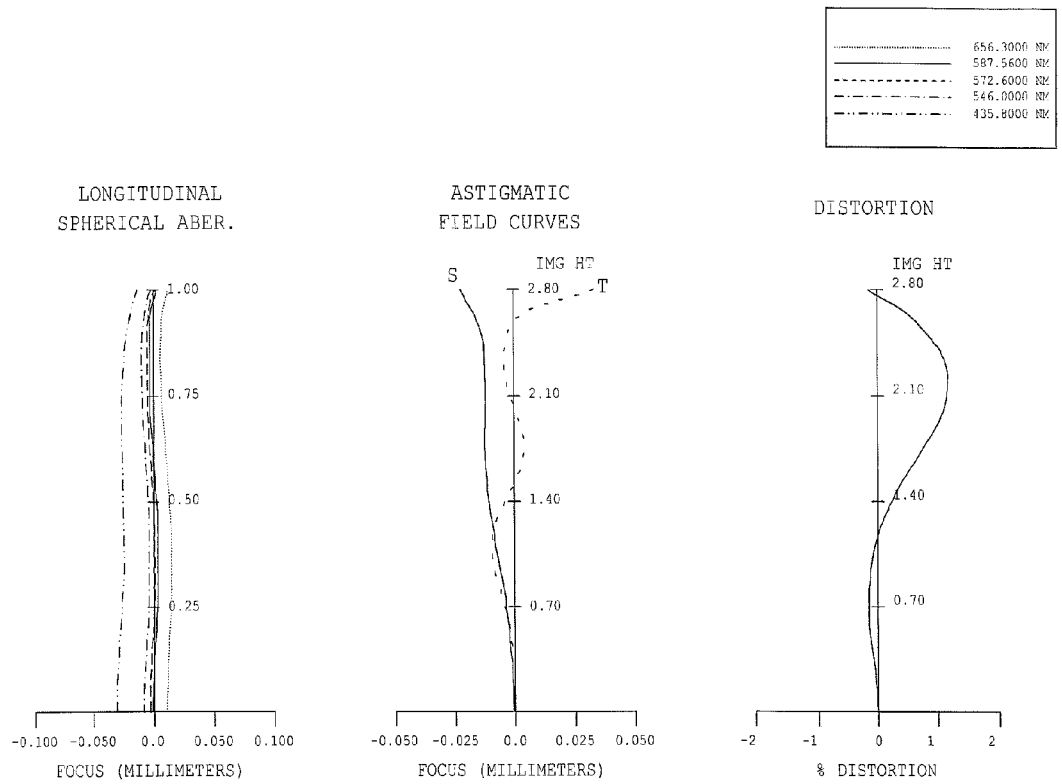
FIG. 2 is a graph showing aberration characteristic according to an embodiment of the present invention.

As a graph (0.0F through 1.0F) showing an aberration diagram according to the above embodiment, FIG. 2 is a graph measuring longitudinal spherical aberration, astigmatic field curves, and distortion in order from the left.

In FIG. 2, a Y axis means size of an image, and an X axis means focal distance (unit: mm) and distortion degree (unit: %). In FIG. 2, it is interpreted that an aberration correcting function is good as curves approach to the Y axis. In a shown aberration diagram, because values of images in nearly all fields appear proximate to the Y axis, longitudinal spherical aberration, astigmatic field curves, and distortion all demonstrate a superior figure.

Figure 3A:
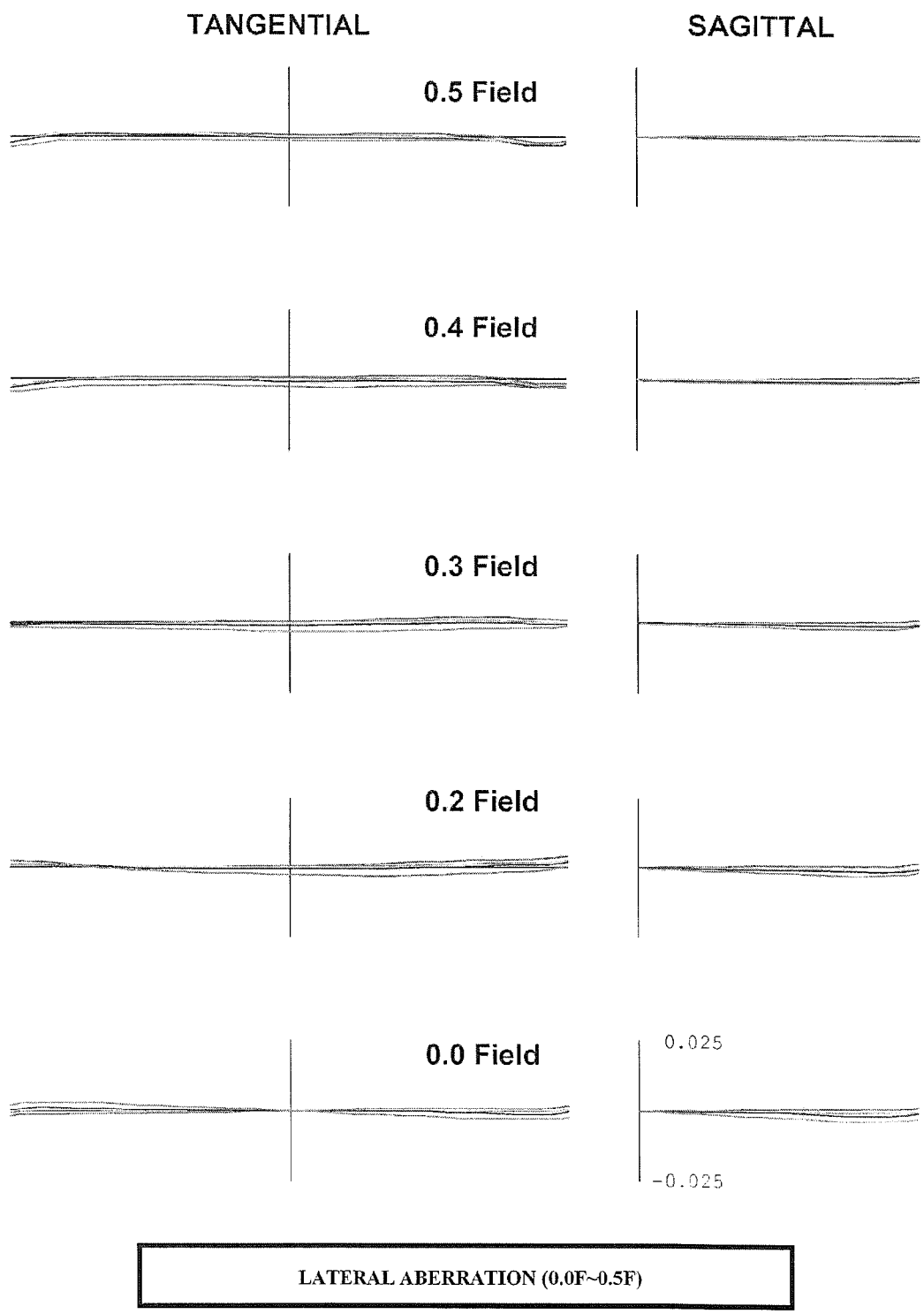
FIG. 3 is a graph showing comatic aberration according to an embodiment of the invention.
Figure 3B:
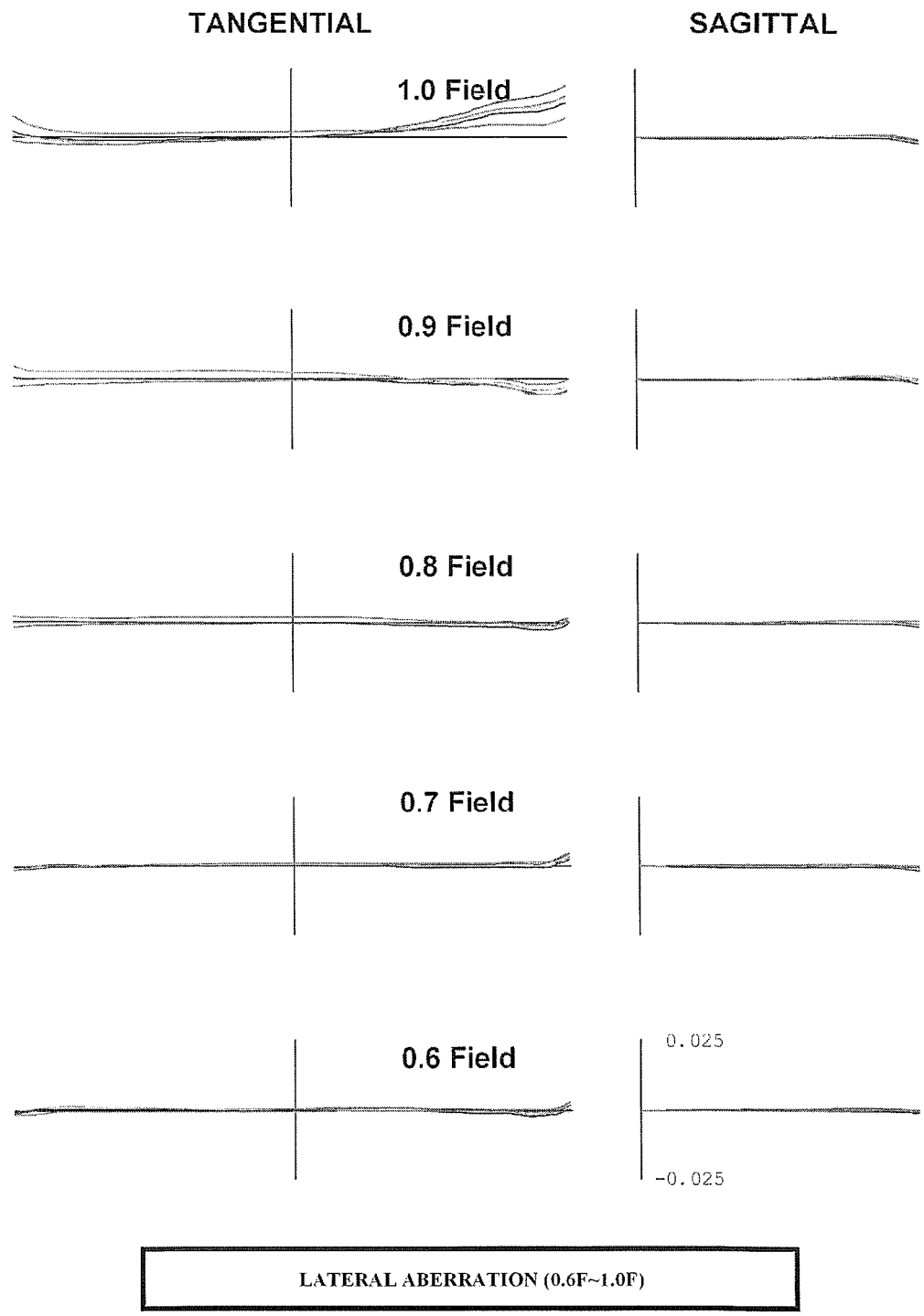

As a graph measuring coma aberration, FIGS. 3a and 3b are graphs measuring tangential aberration and sagittal aberration of each wavelength based on a field height. In FIGS. 3a and 3b, as a graph showing a test result approaches to an X axis at a positive axis and a negative axis, respectively, it is explained that a coma aberration correcting function is good. In measurement examples of FIG. 3, because values of images in nearly all fields appear proximate to an X axis, it is explained that all of them demonstrate a superior commatic aberration correcting function.

While the present invention has been described with reference to embodiments in the above part, it would be understood by those skilled in the art that various changes and modifications can be made without departing from the spirit or scope of the present invention. Therefore, not confined to the above-described embodiment, the invention would be asserted to include all embodiments within the scope of the accompanying claims.

What is claimed is:

1. An imaging lens, comprising, in an order from an object side:
   a first lens having a positive (+) refractive power;
   a second lens having a negative (−) refractive power;
   a third lens having a negative (−) refractive power;
   fourth lens having a negative (−) refractive power; and
   a fifth lens having a positive (+) refractive power,
   wherein an image side surface of the fourth lens is convexly formed.

2. The imaging lens of claim 1, wherein an object side surface of the first lens is convexly formed.

3. The imaging lens of claim 1, wherein the second lens is concavely formed at the object side surface.

4. The imaging lens of claim 1, wherein an object side surface of the third lens is concavely formed.

5. The imaging lens of claim 1, wherein the third lens to the fifth lens are all aspheric surfaces at the object side surface and the image side surface.

6. The imaging lens of claim 1, wherein at least one of the fourth lens and fifth lens is a lens in a meniscus form.

7. The imaging lens of claim 1, wherein when an entire focal length of the imaging lens is f, and a focal length of the first lens is f1, the imaging lens satisfies a condition of $0.5<f1/f<1.5$.

8. The imaging lens of claim 1, wherein when an entire focus point of the imaging lens is f, and a thickness of an entire optical system is d, the imaging lens satisfies a condition of $0.5<d/f<1.5$.

9. The imaging lens of claim 1, wherein when a refractive index of the second lens is N2, the imaging lens satisfies a condition of $1.6<N2<1.7$.

10. The imaging lens of claim 1, wherein when an Abbe value of the second lens is V2, the imaging lens satisfies a condition of $20<V2<30$.

11. The imaging lens of claim 1, wherein when Abbe values of the third lens through fifth lens are V3, V4, V5, the imaging lens satisfies a condition of $50<V4, V5<60$.

12. The imaging lens of claim 1, wherein an object side surface of the fifth lens is convexly formed.

13. The imaging lens of claim 12, wherein the fifth lens has inflection points at both of an object side surface and an image side surface.

14. An imaging lens comprising, in an order from an object side:
   a first lens having positive (+) refractive power;
   a second lens having negative (−) refractive power;
   a third lens having negative (−) refractive power;
   a fourth lens having negative (−) refractive power; and
   a fifth lens having positive (+) refractive power,
   wherein when an entire focal length of the imaging lens is f, and a focal length of the first lens is f1, the imaging lens satisfies a condition of $0.5<f1/f<1.5$.

15. The imaging lens of claim 14, wherein the third lens to the fifth lens are all aspheric surfaces at the object side surface and the image side surface.

16. The imaging lens of claim 14, wherein when an entire focus point of the imaging lens is f, and a thickness of an entire optical system is d, the imaging lens satisfies a condition of $0.5<d/f<1.5$.

17. The imaging lens of claim 14, wherein when a refractive-power index of the second lens is N2, the imaging lens satisfies a condition of $1.6<N2<1.7$.

18. The imaging lens of claim 14, wherein when an Abbe value of the second lens is V2, the imaging lens satisfies a condition of $20<V2<30$.

19. The imaging lens of claim 14, wherein when Abbe values of the third lens through fifth lens are V3, V4, V5, the imaging lens satisfies a condition of $50<V3, V4, V5<60$.

20. An imaging lens, comprising, in an order from an object side:
   a first lens having a positive (+) refractive power;
   a second lens having a negative (−) refractive power;

a third lens having a negative (−) refractive power;
a fourth lens having a negative (−) refractive power; and
a fifth lens having a positive (+) refractive power,
wherein an image side surface of the fourth lens is convexly formed, and
wherein the fifth lens has inflection points at both of an object side surface and an image side surface.

* * * * *